(12) United States Patent
Gardner et al.

(10) Patent No.: US 7,659,330 B2
(45) Date of Patent: Feb. 9, 2010

(54) THERMOPLASTIC COMPOSITES CONTAINING LIGNOCELLULOSIC MATERIALS AND METHODS OF MAKING SAME

(75) Inventors: Douglas J. Gardner, Brewer, ME (US); Christopher H. West, Detroit, ME (US); Yousoo Han, Bangor, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 12/251,756

(22) Filed: Oct. 15, 2008

(65) Prior Publication Data

US 2009/0036575 A1 Feb. 5, 2009

Related U.S. Application Data

(63) Continuation-in-part of application No. 11/228,668, filed on Sep. 16, 2005.

(51) Int. Cl.
*C08J 5/04* (2006.01)
(52) U.S. Cl. .................... 524/13; 524/74; 524/500; 524/605
(58) Field of Classification Search ............ 524/13, 524/733, 14, 16, 27, 35, 72, 74, 500–542, 524/605
See application file for complete search history.

(56) References Cited

U.S. PATENT DOCUMENTS

| | | | |
|---|---|---|---|
| 4,594,386 A * | 6/1986 | Olivier | 525/66 |
| 5,096,945 A | 3/1992 | Sun | |
| 5,948,524 A | 9/1999 | Seethamraju et al. | |
| 6,011,091 A | 1/2000 | Zehner | |
| 6,133,348 A | 10/2000 | Kolla et al. | |
| 6,207,729 B1 * | 3/2001 | Medoff et al. | 523/129 |
| 6,270,833 B1 | 8/2001 | Yamashita et al. | |
| 6,306,951 B1 * | 10/2001 | Montag et al. | 524/505 |
| 6,730,249 B2 | 5/2004 | Sears et al. | |
| 6,758,996 B2 | 7/2004 | Monovoukas et al. | |
| 6,828,374 B2 | 12/2004 | Ishibashi et al. | |
| 6,942,829 B2 | 9/2005 | Drabeck, Jr. et al. | |
| 7,041,716 B2 | 5/2006 | Ton-That et al. | |
| 7,390,846 B2 | 6/2008 | Bacaloglu et al. | |
| 7,432,317 B2 | 10/2008 | Gibson et al. | |
| 7,449,504 B2 | 11/2008 | Richter et al. | |
| 2005/0154095 A1 | 7/2005 | Heath et al. | |
| 2005/0187315 A1 | 8/2005 | Dean | |
| 2006/0267238 A1 | 11/2006 | Wang | |
| 2007/0027234 A1 | 2/2007 | Sigworth et al. | |
| 2007/0138689 A1 | 6/2007 | Bravo et al. | |
| 2007/0208110 A1 | 9/2007 | Sigworth et al. | |
| 2007/0293604 A1 | 12/2007 | Frenkel et al. | |
| 2008/0021135 A1 | 1/2008 | Garft et al. | |
| 2008/0269377 A1 | 10/2008 | Matuana | |
| 2008/0306187 A1 | 12/2008 | Festa et al. | |

FOREIGN PATENT DOCUMENTS

WO    WO 2004/038091    *    5/2004

* cited by examiner

*Primary Examiner*—Kat Wyrozebski
*Assistant Examiner*—Scott W Dodds
(74) *Attorney, Agent, or Firm*—MacMillan, Sobanski & Todd, LLC

(57) ABSTRACT

A composite includes raw lignocellulosic materials dispersed in a thermoplastic polymeric matrix which includes a blend of different polymers. A composite includes raw lignocellulosic materials and a thermal stabilization agent dispersed in a thermoplastic polymeric matrix. A composite includes lignocellulosic nanoparticles dispersed in a thermoplastic polymeric matrix.

13 Claims, 5 Drawing Sheets

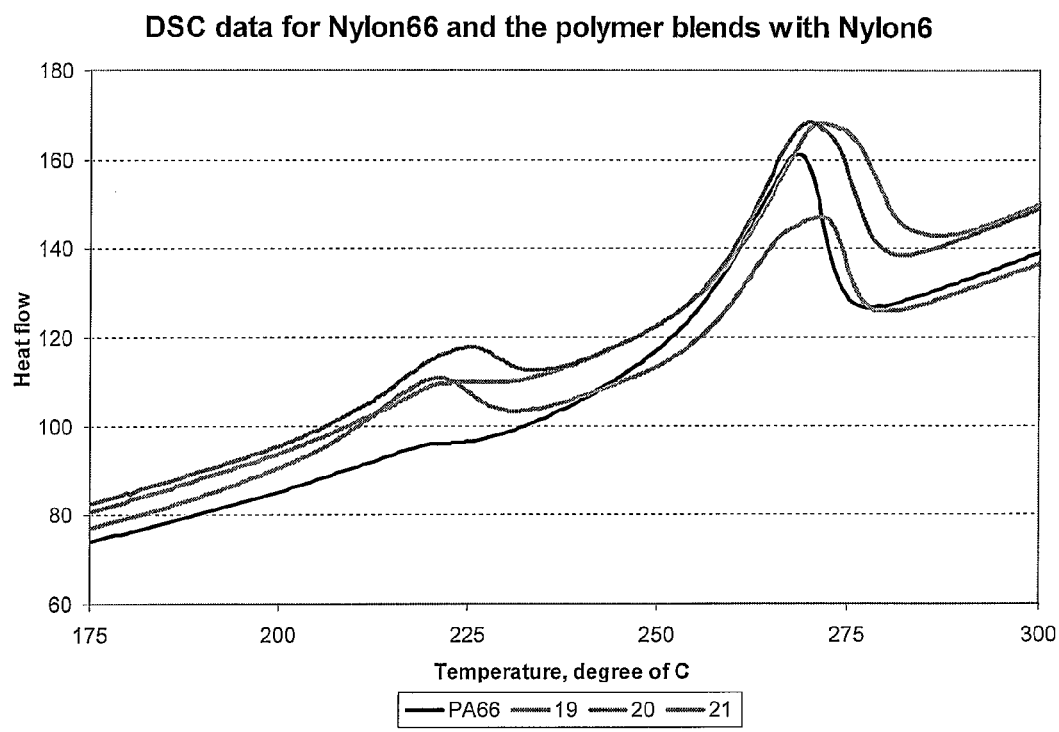
Fig.1 DSC data of Nylon 66 (PA66) and the blends with Nylon 6 (PA6).

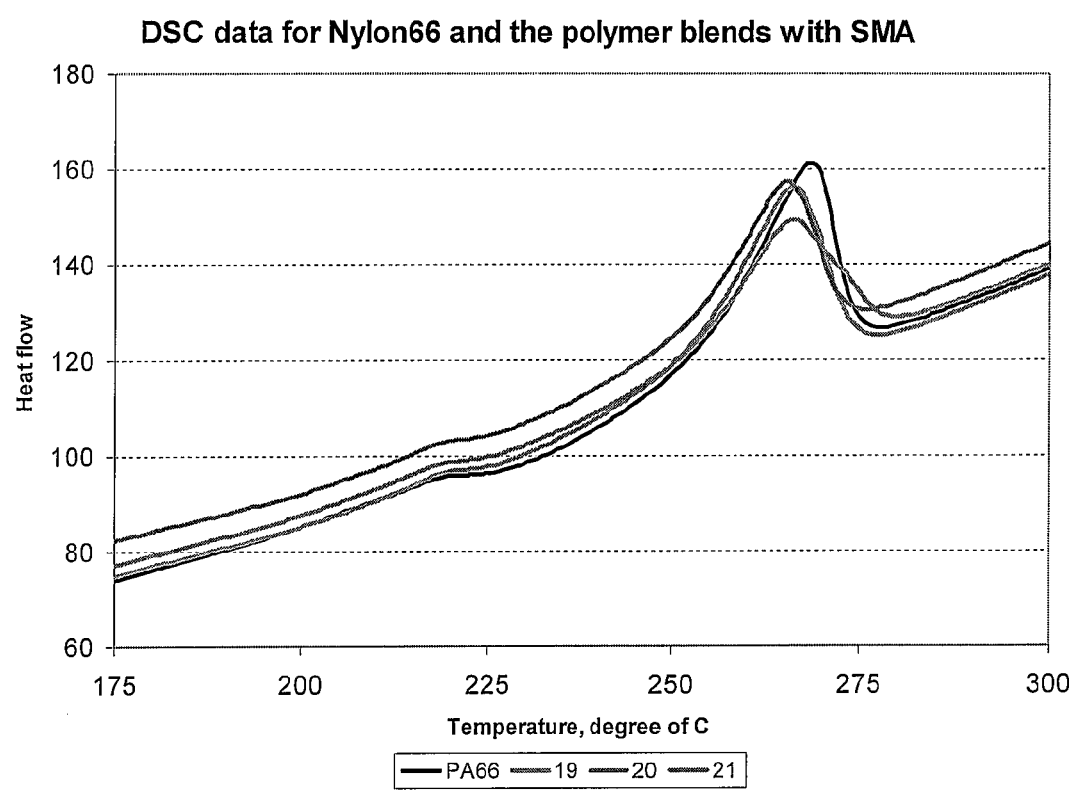
Fig.2 DSC data of Nylon 66 (PA66) and the blends with SMA.

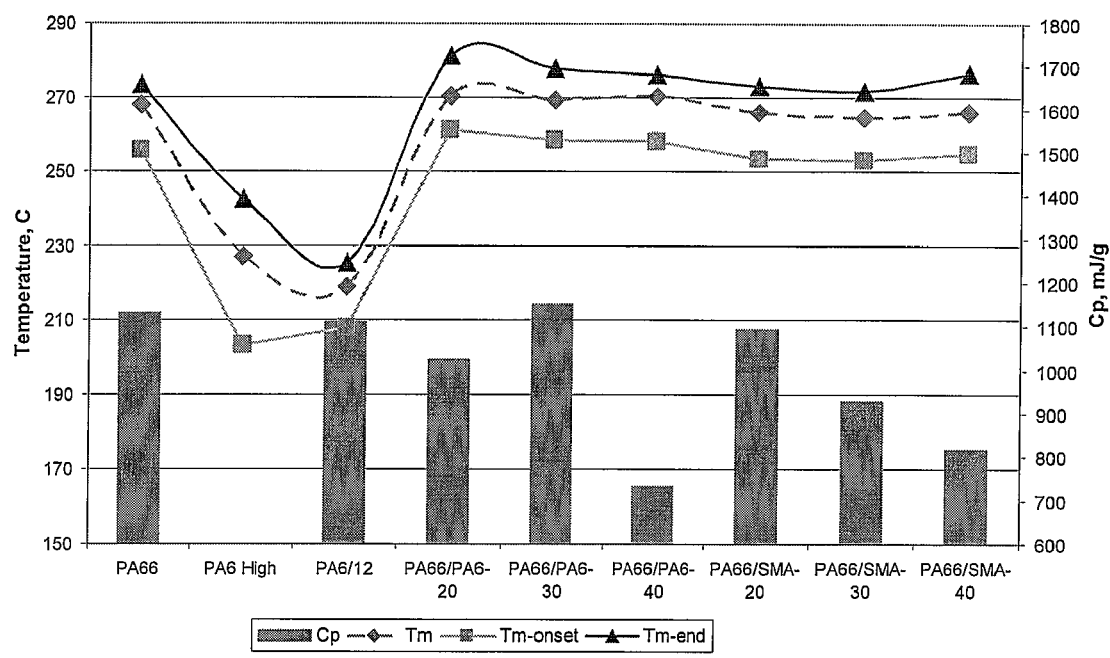
Fig 3. DSC analysis of Nylon polymer blend samples based on the Nylon 66 matrix.

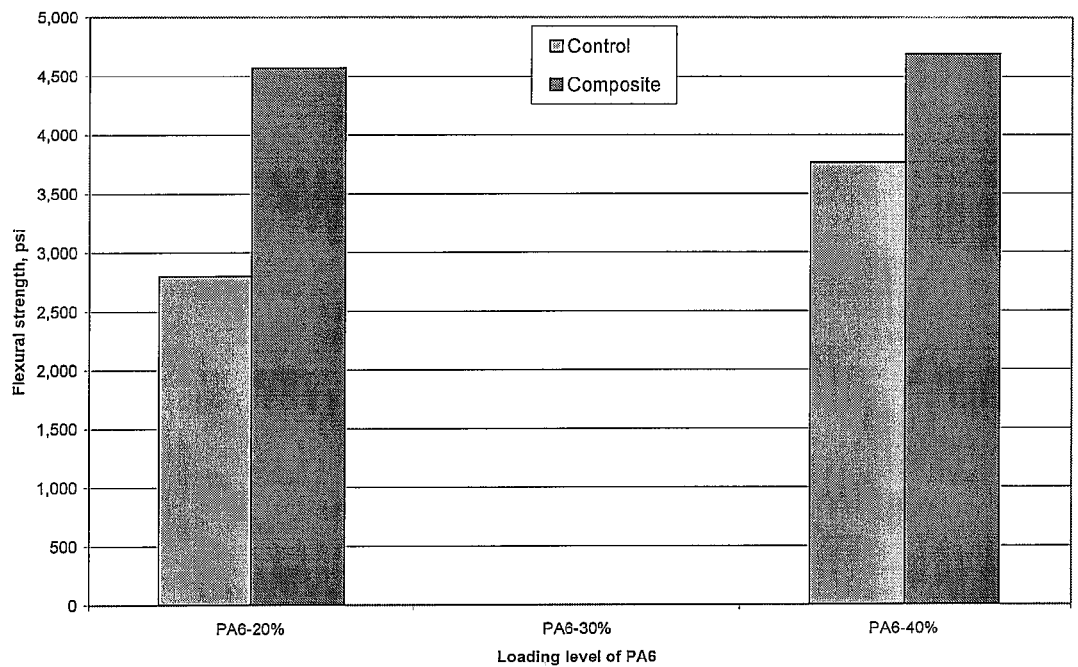
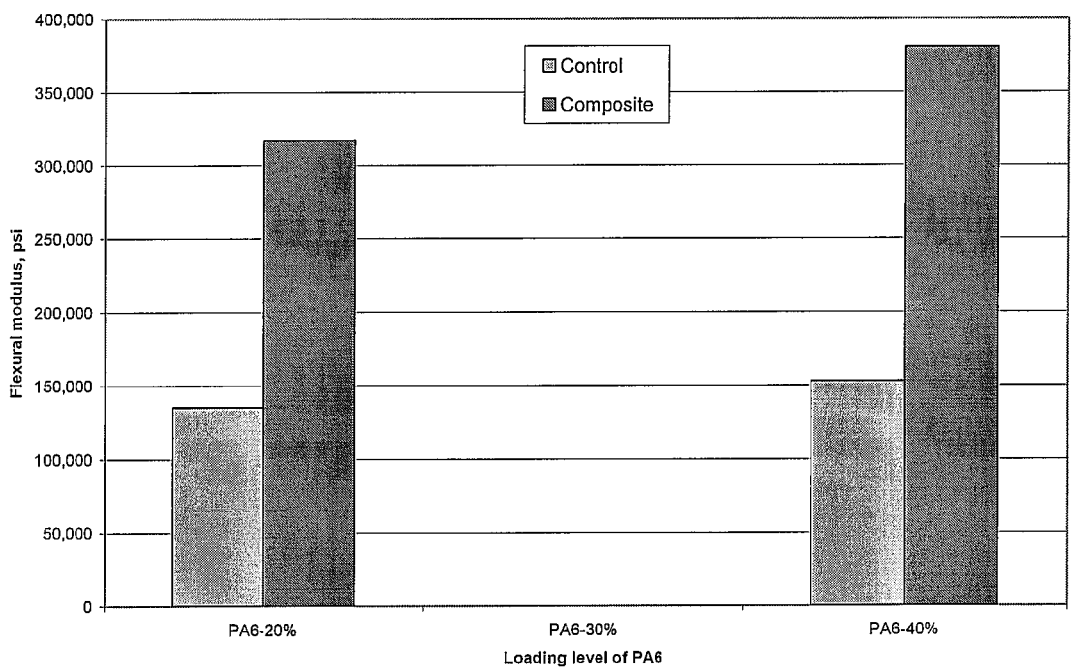
Fig 4. Flexural properties of control and Nylon-wood composite in PA 6/12 + PA6 system.

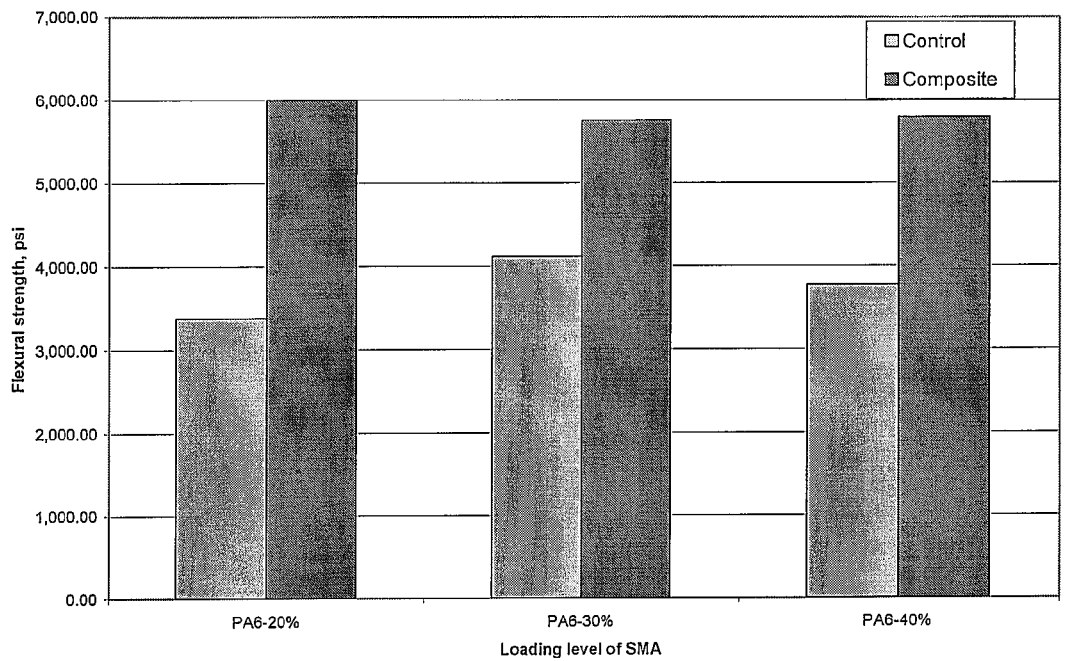
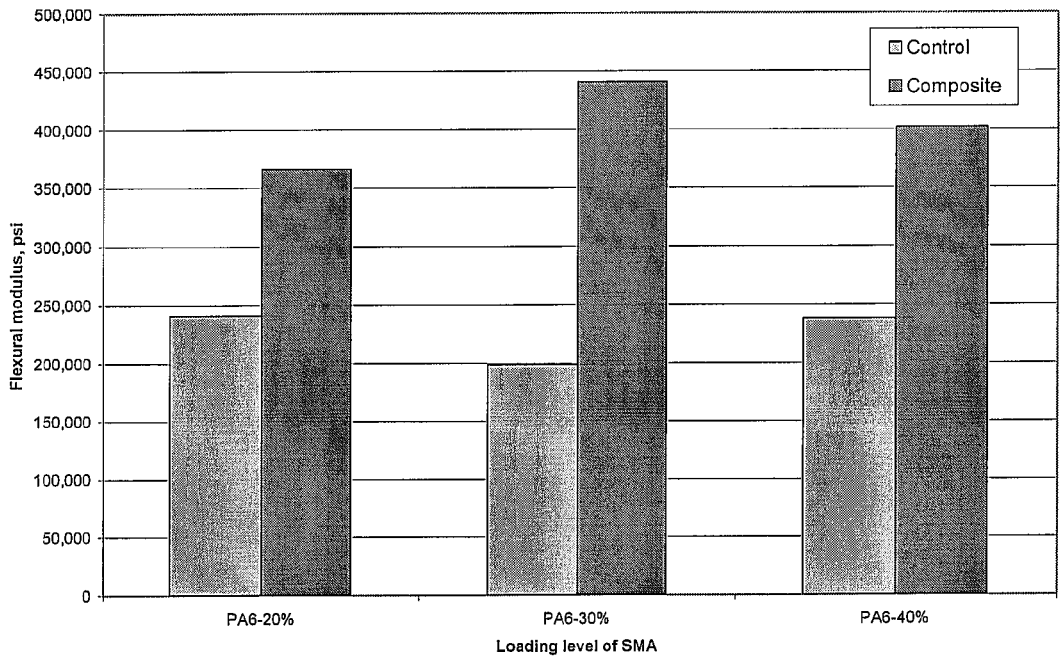
Fig5. Flexural properties of control and Nylon-wood composite in PA6/12+SMA system.

THERMOPLASTIC COMPOSITES CONTAINING LIGNOCELLULOSIC MATERIALS AND METHODS OF MAKING SAME

CROSS-REFERENCE TO RELATED APPLICATIONS

This application is a continuation-in-part of U.S. patent application Ser. No. 11/228,668, filed Sep. 16, 2005, the disclosure of which is incorporated herein by reference.

BACKGROUND OF THE INVENTION

This development relates in general to thermoplastic composites and in particular to composites containing lignocellulosic materials.

Various industries are looking at additive materials to improve the properties of thermoplastics. In particular, there is a need to improve the properties of extruded plastics at competitive prices, while conserving materials and shortening process times. For example, in the past U.S. Pat. No. 5,948,524 to Seethamraju et al. describes combining wood and polymer together, then heating the mixture to melt the polymer.

A common problem is the expense of using pure material, both in terms of the environmental costs and the economic costs of producing thermoplastic composites. U.S. Pat. Nos. 6,270,883 and 6,730,249 to Sears et al. describe thermoplastic composites using high purity and expensive cellulose (where the cellulose is the most thermally stable constituent in wood).

SUMMARY OF THE INVENTION

In one aspect, there is provided a composite comprising raw lignocellulosic materials dispersed in a thermoplastic polymeric matrix which includes a blend of different polymers.

In another aspect, there is provided a method of producing a composite comprising the steps of: melting a blend of a first thermoplastic polymer and a second thermoplastic polymer, the first polymer having a melting point of about 240° C. or higher, and the second polymer lowering the melting point of the polymer blend; and adding raw lignocellulosic materials to the polymer blend to produce a dispersion of the lignocellulosic materials in a matrix of the polymers.

In another aspect, there is provided a composite comprising raw lignocellulosic materials and a thermal stabilization agent dispersed in a thermoplastic polymeric matrix.

In another aspect, there is provided a method of producing a composite comprising the steps of: melting a thermoplastic polymer; coating raw lignocellulosic materials with a thermal stabilization agent; and then adding the coated lignocellulosic materials to the melted polymer to produce a dispersion of the coated lignocellulosic materials in a matrix of the polymer.

In another aspect, there is provided a composite comprising lignocellulosic nanoparticles dispersed in a thermoplastic polymeric matrix.

Various further aspects will become apparent to those skilled in the art from the following detailed description of the preferred embodiment, when read in light of the accompanying drawing.

BRIEF DESCRIPTION OF THE DRAWING

FIG. 1 is a plot showing DSC data for Nylon 66 and blends with Nylon 6.

FIG. 2 is a plot showing DSC data for Nylon 66 and blends with SMA.

FIG. 3 is a plot showing DSC analysis of Nylon-SMA blends.

FIG. 4 shows plots of flexural strength and flexural modulus of control samples made with Nylon blends and experimental samples that were composites made with wood flour and the Nylon blends.

FIG. 5 shows plots of flexural strength and flexural modulus of control samples made with Nylon-SMA blends and experimental samples that were composites made with wood flour and the Nylon-SMA blends.

DETAILED DESCRIPTION OF THE PREFERRED EMBODIMENT

In one aspect, there is provided a composite comprising raw lignocellulosic materials dispersed in a thermoplastic polymeric matrix which includes a blend of different polymers.

The raw lignocellulosic materials are generally defined herein as lignocellulosic material from a plant-based source that has been reduced in size through mechanical actions only. The lignocellulosic material itself has only been reduced in size. The lignocellulosic materials useful in the invention are considered to be in a "raw" state, meaning there has been no chemical modification of the lignocellulosic materials.

Also, the overall concentrations of such lignocellulosic components as cellulose, hemicellulose, lignin and extractives in the lignocellulosic materials remain relatively unchanged. The lignin and hemicellulose components found in the "raw" lignocellulosic materials greatly differ from cellulose since the lignin and hemicellulose components are not nearly as thermally stable as the cellulose component.

Any suitable lignocellulosic material or mixture of different materials can be used. For example, the lignocellulosic material may be derived from a softwood or hardwood source, as well as other types of agricultural fibers including but not limited to rice hulls, sugar cane residue (bagasse), hemp stalks, straw, corn stalks, sunflower stalks, wheat, jute, flax, bamboo, coconut, kenaf, and sisal. Lignin is a polymer having monomeric units of phenylpropanes. Normal softwoods contain from about 26 to about 32% lignin while hardwoods contain from about 20 to about 25% lignin. In addition, the lignin type is slightly different between hardwoods and softwoods. Also, softwoods primarily contain trans-coniferyl alcohol, while hardwoods primarily contain trans-sinapyl alcohol.

In certain embodiments, the lignocellulosic materials are in a particle form. These particles are generated using either milling or granulating technologies, where the lignocellulosic material is broken down in size through mechanical particle reduction. Typically, a small amount of frictional heat is imparted into the process. However, this is not used to reduce the bulk constituents of the lignocellulosic material further. The milled lignocellulosic materials typically have an average length between 0.1 (#140 mesh) and 5 mm (#4 mesh). In certain embodiments, the lignocellulosic materials are in the form of loose fibers, granulated fibers, mechanically milled particles, or pelletized fibers. In certain embodiments, wood particles are in the form of wood flour or sawdust.

In certain embodiments, the water content of the raw lignocellulosic material ranges from about 1 to about 8% by weight Moisture Content (MC). In one embodiment, there is no need for a moisture reduction step for the lignocellulosic materials. In contrast, the conventional extrusion technology requires that less than 2% MC, by weight, in cellulose based material for the conventional extrusion technology to work. The lignocellulosic materials for use herein can have a moisture content of 3% or greater in some embodiments.

The lignocellulosic materials may or may not be pretreated or coated with any materials such as homopolymers, copolymers, random copolymers, alternating copolymers, block copolymers, graft copolymers, liquid crystal polymers, or mixtures thereof.

Preferably, the lignocellulosic materials are substantially dispersed throughout the composite. Any suitable amount of lignocellulosic materials can be used in the composite. In certain embodiments, the amount of lignocellulosic material is between about 20 to about 60%, by weight, and in certain embodiments between about 25 to 55%, by weight, in the composite. In certain other embodiments, the amount of lignocellulosic material is about 60% or less, by weight; in other embodiments, about 40% or less, by weight; and in still other embodiments, about 25% or less, by weight, in the composite.

In one aspect, the lignocellulosic materials are dispersed in a thermoplastic polymeric matrix which includes a blend of different polymers. Any suitable melt-processable solid thermoplastic polymers can be used. Some examples include PA (polyamides such as nylon or polycaprolactam), PET (polyethylene terephthalate), PBT (polybutylene terephthalate), or mixtures thereof. Other examples include PTT (polytrimethylene terephthalate), ECM (ethylene-carbon monoxide) and styrene copolymer blends such as SAN (styrene/acrylonitrile) and SMA (styrene/maleic anhydride) thermoplastic polymers. Still further examples include polyacetals, polyesters, polyacrylates, cellulose butyrate, ABS (acrylonitrile-butadiene-styrene), PC (polycarbonate), PPO (polyphenylene oxide), PSU (polysulphone), PEK (polyetherketone), PEEK (polyetheretherketone), PI (polyimide), methyl methacrylates, and polychlorotrifluoroethylene polymers. In certain embodiments, the thermoplastic polymer is a polyamide selected from Nylon 6, Nylon 12, Nylon 6,6 or mixtures thereof. Examples of other polyamides that may be suitable include Nylon 6,9, Nylon 6,10, Nylon 6,12, Nylon 11, and Nylon 12,12. Copolymers of any of the above-mentioned polymers may also be suitable.

According to one embodiment, the thermoplastic polymer has a melting point of about 180° C. or higher; in other embodiments about 200° C. or higher; and in still other embodiments, between about 220° C. to about 270° C.

In one aspect, the polymer blend includes a first polymer having a relatively high melting point and a second polymer which improves the flowability of the polymer blend at a temperature below the melting point of the first polymer. For example, this temperature may be any suitable temperature for compounding the polymers and the lignocellulosic materials. In a particular example, the compounding temperature is 230° C., although any other suitable temperatures can be used.

In some embodiments, the first polymer has a melting point of about 240° C. or higher, more particularly about 250° C. or higher, and most particularly about 260° C. or higher. The first polymer can be any of those described above which have the desired melting point. For example, PET has a melting point of about 265° C., Nylon 6,6 has a melting point of about 263° C., and Nylon 6,12 has a melting point of about 250° C.

In some embodiments, the second polymer improves the flowability of the polymer blend by lowering the melting point of the blend, when it is melted and blended with the first polymer. In certain embodiments, the second polymer lowers the melting point of the polymer blend at least about 10° C. compared with the first polymer alone, and more particularly at least about 20° C. Also in certain embodiments, the second polymer lowers the melting point of the polymer blend below about 240° C., more particularly below about 235° C., and most particularly below about 230° C.

Any suitable second polymer can be used in the blend. In some embodiments, the second polymer has a melting point of about 235° C. or lower, more particularly about 230° C. or lower, and most particularly about 225° C. or lower. Some examples of polymers that can be suitable for use as the second polymer include PTT (polytrimethylene terephthalate) which has a melting point of about 228° C., PBT (polybutylene terephthalate) which has a melting point of about 225° C., and Nylon 6 which has a melting point of about 221° C.

In certain embodiments, one or both of the first and second polymers is an engineering thermoplastic in contrast to a commodity plastic. Some examples of engineering thermoplastics are PET, PA, PBT, ABS, PC, PI, PPO, PSU, PEK and PEEK.

In another aspect, the polymer blend includes a first polymer having a relatively high melting point, such as described above, and a second polymer which improves the flowability of the polymer blend by improving the interaction between the polymers and the lignocellulosic materials. For example, the second polymer may help make the interfaces between the lignocellulosic materials and the polymers more compatible. This better compatibility or close contact between the lignocellulosic materials and the polymers may reduce the viscosity of the composite melt for good mixing of the materials.

Any suitable type of second polymer can be used for this purpose. In one embodiment, the second polymer is a reactive polymer having functional groups that can react with functional groups of the lignocellulosic materials. For example, the reactive polymer may have a hydrocarbon backbone and functional groups that can react with hydroxyl groups of the lignocellulosic materials, resulting in the polymer providing a coating effect on the lignocellulosic materials that helps make the interface more compatible.

Many different types of reactive polymers, or mixtures thereof, may be suitable for use in the polymer blend. In some embodiments the reactive polymer contains reactive acids and/or acid anhydrides and/or derivatives thereof. For example, the reactive polymer may contain carboxylic acid or carboxylic anhydride groups such as polyacrylic acid and polymers containing acrylic acid, copolymers of olefin and maleic anhydride, copolymers of styrene and maleic anhydride, and polyolefins reacted with maleic anhydride.

In some embodiments, the reactive polymer is selected from maleic anhydrides and related cyclic anhydrides. Some particular examples include maleic anhydride styrene copolymers (MSC), (also called styrene maleic anhydride copolymer or SMA), maleic anhydride/styrene/acrylate and methyl methacrylate tertpolymers, polyoctadecyl maleic anhydride (PODMA), partial esters of PODMA or MSC, succinated olefin copolymers (OCP), succinated polypropylene, succinated polyethylene, succinated polyisobutylene, succinated isoprene/isobutylene copolymers, maleic anhydride/alpha olefin copolymers poly (maleic anhydride-alt-1-octadecene), polymaleic anhydride-alt-1-tetradecene), poly (isobutylene-alt-maleic anhydride), poly(ethylene-alt-maleic anhydride), poly(ethylene-co-ethyl acrylate-co-maleic anhydride), poly(acrylic acid-co-maleic acid), polyolefins-graft-maleic anhydride, partial MSC-esters and PODMA-esters, partial esters of a maleic anhydride copolymer, a malan/ styrene copolymer (1:1) such as Scripset available from Hercules; MW=350,000, maleic anhydride derivatives, and the like.

Some other examples of reactive polymers that may be suitable include polyacrylic acids, polyacrylates, copolymers of polyacrylic acid and polyacrylate, polylactic acid and derivatives, polyacrylonitriles, polyacrylamides, and the like.

The thermoplastic polymers can be included in the composite in any suitable amount. In certain embodiments, the total amount of thermoplastic polymers is from about 35% to about 85% by weight of the composite, and more particularly from about 40% to about 75%. Also, the first and second polymers can be included in any suitable proportions. In certain embodiments, the amount of first polymer is from about 50% to about 90% by total weight of the polymers, and the amount of second polymer is from about 10% to about 50% by total weight of the polymers.

The composite including the first and second thermoplastic polymers and the raw lignocellulosic materials can be produced by any suitable method. For example, the polymers can be melted and the lignocellulosic materials added in any suitable order. In one embodiment, the composite is prepared by melting a blend of the first thermoplastic polymer and the second thermoplastic polymer, and then adding the lignocellulosic materials to the polymer blend to produce a dispersion of the lignocellulosic materials in a matrix of the polymers. The lignocellulosic materials are stabilized by the premelting of the thermoplastic polymers prior to mixing with the lignocellulosic materials.

In another aspect, there is provided a composite comprising raw lignocellulosic materials and a thermal stabilization agent dispersed in a thermoplastic polymeric matrix. The matrix can include a blend of polymers as described above or a single polymer. The thermal stabilization agent deters thermal degradation of the lignocellulosic materials at elevated temperatures. For example, it can protect the lignocellulosic materials from thermal degradation when the lignocellulosic materials are mixed with molten polymer during production of the composite. Any suitable thermal stabilization agent or a mixture of different agents can be used.

In one embodiment, the thermal stabilization agent is a lubricant. Any suitable lubricant or a mixture of different lubricants can be used. In a particular embodiment, the lubricant is selected from the group consisting of metal salts of fatty acids, esters of fatty acids, waxes, and fat chemistry products. Some examples of metal salts of fatty acids include the sodium, magnesium, calcium, aluminum and zinc salts of stearate or distearate, stearyl stearate, and the lithium, odium, and calcium salts of montanic acid. Some examples of waxes include montan wax and polyolefin wax. Some examples of fat chemistry products include fatty acids and fatty alcohols.

The lubricant can be in any suitable form, including a liquid such as an oil or a solid such as a powder. When the lubricant is in the form of a powder, in one aspect it may be milled to a relatively small particle size, for example a particle size of less than about 10 microns, and more particularly less than about 1 micron.

In other embodiments, the thermal stabilization agent includes, for example, organotin compounds (including but not limited to mercaptides, maleates, and carboxylates), organo-phosphites, thiosynergistic antioxidants, hindered phenolic antioxidants, carbon black, and hindered amine stabilizers, and combinations thereof.

The thermal stabilization agent can be included in any suitable amount in the composite. In certain embodiments, the amount of stabilization material is between about 3 to about 10%, by weight, and in certain embodiments between about 4 to 9%, by weight, in the composite.

The thermal stabilization agent and the lignocellulosic materials can be combined with the thermoplastic polymer(s) in any suitable manner in the production of the composite. In one embodiment, the thermal stabilization agent is substantially mixed with the raw lignocellulosic materials and then the mixture is dispersed throughout the thermoplastic matrix. The thermal stabilization agent and the lignocellulosic materials can be mixed with any suitable mixing apparatus. In a particular embodiment, they are mixed together by compounding them in a compounding extruder.

In one embodiment, the thermal stabilization agent and the lignocellulosic materials are mixed together so that the thermal stabilization agent is disposed as a coating layer on the lignocellulosic materials. The method involves melting the thermoplastic polymer(s), coating the raw lignocellulosic materials with the lubricant, and then adding the coated lignocellulosic materials to the melted polymer to produce a dispersion of the coated lignocellulosic materials in a matrix of the polymer.

In another aspect, the lignocellulosic materials are stabilized by introducing a process additive that reduces the thermoplastic melt temperature. Some examples of these include (but are not limited to) Ziegler-Natta based catalysts, inorganic salts (such as LiBr, LiCl), metallocene, benzene-sulfonamides, styrene-acrylic acid copolymers, and diglycidyl ether of bisphenol A (DGEBA).

In another aspect, the lignocellulosic materials are stabilized by including in the composite a process additive that increases surface compatibilization of the lignocellulosic materials. Some examples of such process additives include coupling, grafting, or compatibilizing agents. Compatibilizing agents can include, for example, titanates, zirconates, silanates, maleic anhydride or mixtures thereof.

Optionally, the composite may further include other materials typically used in composites in suitable amounts. Some examples of such materials are colorants, such as titanium dioxide or carbon black, antioxidants, UV absorbents, and flame retardants.

The composites can be manufactured by any suitable method using any suitable manufacturing equipment. The method typically will include compounding and forming operations. In the compounding operation, the raw lignocellulosic materials and any other components are combined with the thermoplastic polymer(s), by dry blending or melt state blending, to produce a homogenous composite material. The compounding may be a single step process or a multi-step process. For example, as described above, the thermal stabilization agent may first be mixed with the lignocellulosic materials, and then the mixture combined with the molten polymer(s).

In the forming operation, the homogenous composite material is formed into the desired shape of the composite article, and the molten polymer(s) are allowed to cool and harden to produce the article. Any suitable type of forming process can be used, such as extrusion or molding. Some examples of typical molding processes are injection molding and compression molding. Equipment for compounding, extrusion and molding is well known in the art.

In some embodiments, the use of the raw lignocellulosic materials allows for the blending of the components and the shaping of the resultant composite materials at lower processing temperatures. For example, the composite materials may be injection molded using processing temperatures below those used with conventional composites, even below the melting point of the pure polymeric matrix material itself. However, higher processing temperatures may also be used.

The composite articles produced by the method can be any of a wide variety of articles suitable for production with lignocellulosic materials dispersed in a thermoplastic polymeric matrix. In some embodiments the composite articles are used in structural applications. Some nonlimiting examples of composite articles that may be produced include outdoor deck floors, railings, fences, landscaping timbers, cladding and siding, park benches, molding and trim, window and door frames, and indoor furniture.

EXAMPLES

The following examples are illustrative of some of the composites and methods of making the same as described herein. They are, of course, not to be considered in any way limitative, and numerous changes and modifications can be made by one of ordinary skill in the art.

Example 1

Composites were prepared using raw lignocellulosic materials in the form of wood flour dispersed in a thermoplastic polymeric matrix made from a blend of polytrimethylene terephthalate (PTT) and recycled poly(ethylene terephthalate) (PET). The PET has a relatively high melting point and the PTT was added to lower the melting point of the polymer blend. The compounding was conducted with a Brabender Prep-mixer® equipped with a bowl mixer and the process temperature and torque changes were measured in real time. Melt temperature and torque changes for every run were recorded to determine optimum processability for the PET-wood flour composites. The basic processing parameters are listed below in Table 1.

TABLE 1

Basic operating parameters of the Brabender Rheomixer

| | Set temp. | Melt temp. | RPM | Mixture melt temp. | Reaction time |
|---|---|---|---|---|---|
| 1$^{st}$ stage (polymer only) | 260° C. | 240° C. | 60-70 | — | 4 min 30 sec |
| 2$^{nd}$ stage (with wood flour) | 230° C. | 200-230° C. | 50 | Controlled under 230° C. | 2 min |

The mixer temperature was set to 260° C. and the polymer melt temperature increased to 240° C. where the polymer blend appears to experience good melting. The rounds per minute (RPM) of the mix blades were increased from 60 to 70 so that the generated shear might facilitate the polymer melting. Wood flour was added to the mixer when the polymer melt appeared well mixed. After addition of the wood flour, the melt temperature dropped sharply to 200° C. and increased again as the mixing progressed. The melt mixture was released from the mixture immediately after the temperature reached 230° C. These temperature ranges and wood flour residence times were recognized as a relatively safe temperature range to prevent severe thermal degradation with a guarantee of composite processability.

Example 2

In one method of preparing a thermoplastic composite, the raw lignocellulosic materials and thermal stabilization agent are pre-mixed, then added to a compounding extruder. Thermoplastic polymers (and optionally pigments and additives) are heated in a melt extruder, then added to the compounding extruder. The compounding extruder mixes together the melted thermoplastic material and the stabilized raw lignocellulosic materials to form a matrix. The matrix can then be sent to a die for further processing as an extrudate.

Extrusion processing runs were conducted on a Davis-Standard® WT-94 Woodtruder™. This particular system consists of a GP94 94 mm counter-rotating parallel twin-screw extruder (28:1 L/D) coupled with a Mark V™ 75 mm single screw extruder. The feed system consists of three (3) Colortronics gravimetric feeders supplying the 75 mm single screw extruder via flood feeding and three (3) Colortronics gravimetric feeders supplying the 94 mm twin screw extruder via starvation feeding. Decking material was extruded in a profile measuring 20 mm×135 mm (0.75"×5.375"). The wood utilized was 40 mesh sawdust from American Wood Fiber (#4020BB). This wood is a commercially available wood furnish that has only been mechanically reduced in size from larger constituents. The polymer used was a commercially available nylon 6-6,6 from BASF (#Ultramid C35 NAT). The thermal stabilizing agent used in this example was zinc stearate (Synpro #6723032109944). In this example, a total of eight formulations were manufactured. The processing parameters for each formulation are summarized below in Table 2.

TABLE 2

Processing Parameters During Manufacture of Nylon-WPC

| Processing Variables | | Formulation # | | | | | | | |
|---|---|---|---|---|---|---|---|---|---|
| | | 1 | 2 | 3 | 4 | 5 | 6 | 7 | 8 |
| RATIO | Wood | 25% | 35% | 45% | 43% | 50% | 55% | 44% | 29% |
| | Stabilizer | 4% | 4% | 4% | 7% | 6% | 5% | 7% | 9% |
| | Polymer | 71% | 61% | 51% | 50% | 44% | 40% | 49% | 63% |
| TWIN SCREW | Melt Temperature (° C.) | 189 | 189 | 189 | 188 | 190 | 191 | 190 | 191 |
| | Pressure (lb/in$^2$) | 375 | 425 | 500 | 375 | 400 | 700 | 275 | 115 |

TABLE 2-continued

Processing Parameters During Manufacture of Nylon-WPC

| | Processing Variables | Formulation # | | | | | | | |
|---|---|---|---|---|---|---|---|---|---|
| | | 1 | 2 | 3 | 4 | 5 | 6 | 7 | 8 |
| SINGLE SCREW | Screw speed (RPM) | 30 | 30 | 30 | 30 | 30 | 30 | 30 | 30 |
| | Torque Load | 22% | 23% | 24% | 25% | 30% | 42% | 23% | 13% |
| | Melt Temperature (° C.) | 220 | 220 | 220 | 220 | 220 | 219 | 219 | 219 |
| | Pressure (lb/in$^2$) | 1,200 | 1,200 | 1,200 | 1,200 | 1,200 | 1,200 | 1,200 | 1,150 |
| | Screw speed (RPM) | 40 | 40 | 40 | 40 | 40 | 40 | 40 | 40 |
| | Torque Load | 68% | 68% | 68% | 68% | 68% | 68% | 68% | 67% |

The eight formulations were examined for both flexural (bending) and tensile properties. Flexural testing was conducted in accordance with ASTM D 6109. (D6109-05 Standard Test Methods for Flexural Properties of Unreinforced and Reinforced Plastic Lumber and Related Products). The modulus of rupture (MOR) and modulus of elasticity (MOE) of the material is listed. Tensile testing was conducted in accordance with ASTM D 638, Type III.) D638-03 Standard Test Method for Tensile Properties of Plastics). The tensile strength of the material is listed. The properties of each formulation are shown below in Table 3.

TABLE 3

Mechanical Properties of Nylon-WPC

| Mechanical Property | Formulation # | | | | | | | |
|---|---|---|---|---|---|---|---|---|
| | 1 | 2 | 3 | 4 | 5 | 6 | 7 | 8 |
| MOR (ksi) | 8.4 | 12.9 | 12.0 | 10.3 | 9.9 | 7.0 | 9.0 | 9.0 |
| TMOE (ksi) | 360 | 665 | 885 | 707 | 687 | 586 | 611 | 435 |
| Tensile Strength (ksi) | 8.0 | 4.6 | 4.3 | 4.9 | 4.4 | 2.3 | 4.2 | 4.9 |

Note:
MOR and TMOE determined in accordance with ASTM D 6109
Tensile Strength determined in accordance with ASTM D 638

Example 3

Introduction

The goal of this study was to improve the flowability of Nylon-wood composite melt mixtures at a relatively low operating temperature range compared to conventional Nylon composite processing. The improved flowability might increase the dispersion and distribution of wood flour during thermal processing of the composites. The target operating temperature was less than 230° C. to minimize the thermal degradation of wood. Within the target temperature range, Nylon 66 is not completely melted but we found that the softness can be improved with the addition of low viscous polymers and/or functional reactive polymers, which allows the polymer melt blend to thermally mix with wood. Nylon 66 and Nylon 6/12 were blended with Nylon 6, and styrene maleic anhydride copolymer (SMA) was added to improve the flowability of the polymer blend melt with wood flour at a low operating temperature range for extrusion processing. The melting temperature (Tm) of Nylon 6 is around 227° C. which is significantly lower than the 267° C. melting temperature of Nylon 66. The molten Nylon 6 at around 230° C., the target of operating temperature in this study, helps the polymer blends to flow well enough so that wood flour could be dispersed and distributed without significant thermal degradation. SMA is a reactive styrene copolymer that has a maleic anhydride functional group. We believe that SMA is reacted with hydroxyl groups of wood resulting in a coating effect that helps interfaces between coated wood flour and Nylon 66 be more compatible. The close contact or better compatibility between wood and Nylon might reduce the viscosity of the Nylon-wood composite melt for good mixing. Differential scanning calorimeter (DSC) was applied to analyze the thermal properties of polymer blends. For the mechanical properties of composite samples, flexural and impact tests were performed.

MATERIALS AND METHODS

The materials and their properties used in this study are shown below in Table 4. For the compounding process in this study, each polymer blend and Nylon-wood composite was thermally compounded using a Brabender Rheomixer®. The operating temperature was maintained less than 230° C. to prevent thermal degradation of wood flour except the polymer blends without wood addition. An additional processing factor examined included residence time, that is the time duration when the wood is exposed to high temperature, and it was maintained at around 3 minutes. These conditions were selected for possible future process scale-up since those conditions can be recreated by the Woodtruder® system, a pilot scale extrusion system with full downstream, at the AEWC Center, University of Maine, Orono, Me., USA. The formulations and sample nomenclature are listed in Table 5. For the mechanical properties, flexural tests were done for modulus of rupture and modulus of elasticity.

TABLE 5

Nomenclature of samples and their formulations.

| # | Name | Wood | PA 66 | PA 6/12 | PA 6 | SMA | Lub. |
|---|---|---|---|---|---|---|---|
| 01 | Control PA6-12-PA6-20 | 0% | | 80% | 20% | | 0% |
| 02 | Control PA6-12-PA6-30 | | | 70% | 30% | | 0% |
| 03 | Control PA6-12-PA6-40 | | | 60% | 40% | | 0% |
| 04 | Control PA6-12-PA6M-20 | | | 80% | | | 0% |
| 05 | Control PA6-12-PA6M-30 | | | 70% | | | 0% |
| 06 | Control PA6-12-PA6M-40 | | | 60% | | | 0% |
| 07 | Control PA6-12-SMA-20 | | | 80% | | 20% | 0% |
| 08 | Control PA6-12-SMA-30 | | | 70% | | 30% | 0% |
| 09 | Control PA6-12-SMA-40 | | | 60% | | 40% | 0% |
| 10 | Com 40 PA6-12-PA6-20 | 40% | | 44% | 11% | | 5% |
| 11 | Com 40 PA6-12-PA6-30 | | | 38.5% | 16.5% | | 5% |
| 12 | Com 40 PA6-12-PA6-40 | | | 33% | 22% | | 5% |
| 13 | Com 40 PA6-12-PA6M-20 | | | 44% | | | 5% |
| 14 | Com 40 PA6-12-PA6M-30 | | | 38.5% | | | 5% |
| 15 | Com 40 PA6-12-PA6M-40 | | | 33% | | | 5% |
| 16 | Com 40 PA6-12-SMA-20 | | | 44% | | 11% | 5% |
| 17 | Com 40 PA6-12-SMA-30 | | | 38.5% | | 16.5% | 5% |
| 18 | Com 40 PA6-12-SMA-40 | | | 33% | | 22% | 5% |
| 19 | Control PA66-PA6-20 | 0% | 80% | | 20% | | 0% |
| 20 | Control PA66-PA6-30 | | 70% | | 30% | | 0% |
| 21 | Control PA66-PA6-40 | | 60% | | 40% | | 0% |
| 22 | Control PA66-SMA-20 | | 80% | | | 20% | 0% |
| 23 | Control PA66-SMA-30 | | 70% | | | 30% | 0% |
| 24 | Control PA66-SMA-40 | | 60% | | | 40% | 0% |

TABLE 4

List of materials and properties used in this study.

| Material | Product name | Manufacturer | Melt Temp. (° C.) | Tensile Strength (MPa) | Note |
|---|---|---|---|---|---|
| Nylon 66 | Zytel 101 | DuPont | 262 | 82 | |
| Nylon 6/12 | Zytel 159L | DuPont | 250 | 62 | Lubricated |
| Nylon 6 | Zytel 7301 | DuPont | 221 | 80 | |
| SMA | Dylark 232 | NovaChem | 232 | 49 | MA 7.5% |

RESULTS AND DISCUSSION

Process Control

First, Nylon 6/12 was fed into the reaction chamber of Rheomixer® at 260° C. When the polymer melted entirely, the temperature of chamber was set to 230° C. and wood flour was fed rapidly. Because of the low temperature of wood, the melt temperature instantly decreased to the 190–200° C. range. It took about 3 minutes for the melt temperature to again reach the set temperature of 230° C., which was enough time for the wood to be mixed with the polymer matrix. In all samples, we could not find any serious thermal degradation and this phenomena could be clarified from the mechanical data to follow in a later section of this report.

Thermal Analysis

The thermal properties from DSC analysis are shown at FIGS. 1, 2, and 3. According to the results, the addition of Nylon 6 didn't decrease Tm of the blend with Nylon 66. SMA, however, decreased the Tm of the Nylon 66 part of the blend. A lower Tm might imply better flowability of the polymer blends under a relatively low temperature range around 230° C. This implication is clarified by the data of heat capacity in FIG. 3. The heat capacity of Nylon 66 was 1113.63 mJ/g and the polymer blends with SMA at a loading level of 30 and 40% wt. show only 930.09 and 819.44 mJ/g, which means the Nylon 66 part of the blends may be melted down more easily than pure Nylon 66. Even though the Tm didn't change in the polymer blends of Nylon 66 and Nylon 6, the heat capacity of Nylon 66 in the blends showed a lower heat capacity, 733.95 mJ/g, in the blend loaded with 40% Nylon 6.

Flexural Properties

It is noted that flexural properties were increased in the all composite samples compared to the control samples without wood addition. FIGS. 4 and 5 show the increases in flexural properties. In the mixture of Nylon 6/12 added with Nylon 6, the composite filled with wood flour showed increases of 65% and 153% in strength and stiffness. The loading level of wood was 40% by weight. The content of Nylon 6 affected the flexural properties as well. Higher contents of Nylon 6 in the control and composites increased the flexural properties. In the mixture of Nylon 6/12 added with SMA instead of Nylon 6, increases of strength and stiffness were found. There were increases of 76% and 120% in strength and stiffness. The effect of SMA loading levels, however, was not clarified in these mixtures. It must be noted that the stiffness of the Nylon-wood composites is 15% higher than that of Nylon 66, an engineering plastic.

SUMMARY

Thermal analysis and flexural tests were performed with Nylon-wood composite samples. Changes in heat capacity of the composites showed a potential that the flowability of melts could be improved at a relatively low temperature range. An addition of wood flour into the nylon polymer blends significantly increased mechanical properties. The mechanical improvements imply that serious thermal degradation could be avoided according to the process applied in this study. The high value of stiffness in Nylon-wood composites promises great potential for structural applications.

While the thermoplastic composites have been described herein with reference to various embodiments, it should be understood that various changes may be made and equivalents may be substituted for elements thereof. In addition, many modifications may be made to adapt a particular situation or material to the teachings herein. Therefore, it is intended that the composites not be limited to the particular embodiments disclosed herein but that they will include all embodiments falling within the scope of the claims.

What is claimed is:

1. A composite comprising raw lignocellulosic materials dispersed in a thermoplastic polymeric matrix which includes a blend of different thermoplastic polymers, wherein the raw lignocellulosic materials have not been chemically modified and have only been reduced in size through mechanical actions, and the concentrations of cellulose, hemicellulose, lignin and extractives in the lignocellulosic materials are substantially unchanged from the original concentrations, and wherein the polymer blend includes a first thermoplastic polymer having a melting point of about 240° C. or higher and a second thermoplastic polymer which improves the flowability of the polymer blend, wherein the second thermoplastic polymer is a reactive polymer selected from the group consisting of maleic anhydride styrene copolymers (MSC), maleic anhydride/styrene/acrylate and methyl methacrylate tertpolymers, polyoctadecyl maleic anhydride (PODMA), partial esters of PODMA or MSC, succinated polypropylene, succinated polyethylene, succinated polyisobutylene, succinated isoprene/isobutylene copolymers, maleic anhydride/alpha olefin copolymers, poly(maleic anhydride-alt-1-octadecene), poly(maleic anhydride-alt-1-tetradecene), poly(isobutylene-alt-maleic anhydride), poly(ethylene-co-thyl acrylate-co-maleic anhydride), poly(acrylic acid-co-maleic acid), partial MSC-esters and PODMA-esters, partial esters of maleic anhydride copolymer, and malan/styene copolymers (1:1), and wherein the amount of first polymer is from about 50% to about 90% by total weight of the polymers and the amount of the second polymer is from about 10% to about 50% by total weight of the polymers, and wherein the amount of lignocellulosic material in the composite is between about 20% to about 60% by total weight of the composite.

2. The composite of claim 1, wherein the second polymer improves the flowability of the polymer blend at a temperature of 230° C.

3. The composite of claim 1, wherein the first polymer has a melting point of about 250° C. or higher.

4. The composite of claim 1, wherein the first polymer is an engineering thermoplastic.

5. The composite of claim 1, wherein the second polymer has a melting point of about 235° C. or lower.

6. The composite of claim 1, additionally comprising a thermal stabilization agent dispersed in the polymeric matrix, the thermal stabilization agent functioning to prevent thermal degradation of the lignocellulosic materials.

7. The composite of claim 6, wherein the thermal stabilization agent is a lubricant.

8. A method of producing a composite comprising the steps of:

melting a blend of a first thermoplastic polymer and a second thermoplastic polymer, the first polymer having a melting point of about 240° C. or higher, wherein the second thermoplastic polymer is a reactive polymer selected from the group consisting of maleic anhydride styrene copolymers (MSC), maleic anhydride/styrene/acrylate and methyl mathacrylate tertrolymers, polyoctadecyl maleic anhydride (PODMA), partial esters of PODMA or MSC, succinated polypropylene, succinated polyethylene, succinated polyisobutylene, succinated isoprene/isobutylene copolymers, maleic anhydride/alpha olefin copolymers, poly(maleic anhydride-alt-1-octadecene), poly(maleic anhydride-alt-1-tetradecene), poly(isobutylene-alt-maleic anhydride), poly(ethylene-co-thyl acrylate-co-maleic anhydride), poly(acrylic acid-co-maleic acid), partial MSC-esters and PODMA-esters, partial esters of maleic anhydride copolymer, and malan/styene copolymers (1:1), and wherein the amount of first polymer is from about 50% to about 90% by total weight of the polymers and the amount of the second polymer is from about 10% to about 50% by total weight of the polymers; and adding raw lignocellulosic materials to the polymer blend to produce a dispersion of the lignocellulosic materials in a matrix of the polymers, wherein the raw lignocellulosic materials have not been chemically modified and have only been reduced in size through mechanical actions, and the concentrations of cellulose, hemicellulose, lignin and extractives in the lignocellulosic materials are substantially unchanged from the original concentrations, and wherein the amount of lignocellulosic material in the composite is between about 20% to about 60% by total weight of the composite.

9. The method of claim 8, comprising an additional step of coating the raw lignocellulosic materials with a thermal stabilization agent before adding them to the polymer blend, the thermal stabilization agent functioning to prevent thermal degradation of the lignocellulosic materials.

10. The method of claim 9, wherein the thermal stabilization agent is a lubricant.

11. The composite of claim 1, wherein the lignocellulosic materials have a moisture content within a range from 1% to 8%.

12. The method of claim 8, wherein the lignocellulosic materials have a moisture content within a range from 1% to 8%.

13. The composite of claim 1, additionally comprising a thermal stabilization agent disposed as a coating on the lignocellulosic materials, the thermal stabilization agent functioning to prevent thermal degradation of the lignocellulosic materials.

* * * * *